United States Patent
Kubo et al.

(10) Patent No.: US 7,626,629 B2
(45) Date of Patent: Dec. 1, 2009

(54) DEVICE AND METHOD FOR GENERATING TIMING SIGNALS OF DIFFERENT KINDS

(75) Inventors: Naoki Kubo, Asaka (JP); Hiroshi Tamayama, Asaka (JP); Takashi Yano, Asaka (JP)

(73) Assignee: Fujifilm Corporation, Tokyo (JP)

( * ) Notice: Subject to any disclaimer, the term of this patent is extended or adjusted under 35 U.S.C. 154(b) by 263 days.

(21) Appl. No.: 11/067,203

(22) Filed: Feb. 28, 2005

(65) Prior Publication Data

US 2005/0146625 A1 Jul. 7, 2005

Related U.S. Application Data

(62) Division of application No. 09/769,387, filed on Jan. 26, 2001, now abandoned.

(30) Foreign Application Priority Data

Jan. 28, 2000 (JP) .............................. 2000-024674

(51) Int. Cl.
  *H04N 3/14* (2006.01)
  *H04N 5/335* (2006.01)
(52) U.S. Cl. .................................... 348/312; 348/220.1
(58) Field of Classification Search .............. 348/220.1, 348/312, 294
  See application file for complete search history.

(56) References Cited

U.S. PATENT DOCUMENTS

| | | | | |
|---|---|---|---|---|
| 4,750,041 A | * | 6/1988 | Vogel et al. | 348/220.1 |
| 6,075,565 A | | 6/2000 | Tanaka et al. | |
| 6,292,218 B1 | * | 9/2001 | Parulski et al. | 348/220.1 |
| 6,496,224 B2 | | 12/2002 | Ueno | |
| 6,580,456 B1 | | 6/2003 | Jacobs | |

FOREIGN PATENT DOCUMENTS

| | | |
|---|---|---|
| JP | 8-032854 | 2/1996 |
| JP | 10-257398 | 9/1998 |
| JP | 11-008802 | 1/1999 |
| JP | 2000-278617 | 10/2000 |

* cited by examiner

*Primary Examiner*—Yogesh Aggarwal
(74) *Attorney, Agent, or Firm*—Birch, Stewart, Kolasch & Birch, LLP

(57) ABSTRACT

A timing signal generating device capable of generating different kinds of signals is disclosed. A first, a second and a third data setting circuit each generate a particular kind of set data for generating corresponding timing signals. The set data are selectively set in a timing pulse generating circuit at the time of start-up of a camera or similar system, which includes the device, or in accordance with the operation mode of the system. The timing pulse generating circuit generates timing signals based on the set data. The timing signals are fed to a solid-state image pickup section and a signal processing section, causing them to operate in accordance with the timing signals.

6 Claims, 8 Drawing Sheets

DEVICE AND METHOD FOR GENERATING TIMING SIGNALS OF DIFFERENT KINDS

This is a Divisional application of application Ser. No. 09/769,387, filed Jan. 26, 2001, now abandoned.

CROSS-REFERENCES TO RELATED APPLICATIONS

This application is a divisional of U.S. application Ser. No. 09/769,387 filed on Feb. 26, 2001. This nonprovisional application claims priority under 35 U.S.C. § 119(a) on Patent Application No. 2000-24674 filed in Japan on Jan. 28, 2000. The entirety of each of the above-identified documents are hereby incorporated by reference.

BACKGROUND OF THE INVENTION

1. Field of the Invention

The present invention relates to a device and a method for generating a plurality of different kinds of timing signals, e.g., control signals for controllably driving a solid-state image pickup device, timing signals for a signal processing circuit, and control signals for periodically controlling various circuits.

2. Description of the Background Art

Today, an image pickup apparatus of the type including a solid-state image pickup device is extensively used. The image pickup device outputs an image signal derived from an optical image, which is representative of a scene incident thereto. The image signal is processed and then recorded in a data recording medium or transmitted to another apparatus, as desired. A controller organically controls a shooting section, a signal processing section, a recording section and other sections constituting the apparatus. A timing signal generating device, or so-called timing generator, generates timing signals that define the operation timings of the various sections of the apparatus.

Japanese patent laid-open publication No. 257398/1998, for example, discloses a generator for generating timing signal which drives a solid-state image pickup device and capable of outputting programmable pulses ø. The generator includes a plurality of frequency dividers for dividing a clock. A selector selects divided clocks output from the frequency dividers in accordance with selection data. A counter counts clocks selected. A decoder decodes clocks output from the counter in accordance with a decode value. Control means sets the data selected and decoded values. The data selected and decoded values are set via a serial port. The problem with this type of device is that data setting effected via a serial line is time-consuming and therefore slows down the operation of the entire system including the device.

Various kinds of solid-state image pickup devices have recently been developed and applied to digital cameras. Various shooting functions are available with a digital camera using a solid-stated image pickup device. For example, the image pickup device is driven at a timing which differs from a still picture to a moving picture, and is sometimes driven in such a manner as to reduce, or thin, pixels to be read out. Such different driving methods each need particular timing signals. Moreover, an image signal output from the image pickup device is subjected to various kinds of signal processing including analog signal processing, digitization, and digital signal processing that processes pixel-by-pixel digital data. For each of such signal processing, particular timing signals must be fed to a particular section of the camera.

To implement multiple functions described above, a great amount of data defining various timings must be set in a signal generating device, consuming a long period of time. As a result, a system including a signal generating device, which can be loaded with data, needs an extra data setting time. For example, substantial part of a start-up time after the power-up of the system must be allocated to data setting, degrading the performance of the entire system.

SUMMARY OF THE INVENTION

It is therefore an object of the present invention to provide a timing signal generating device capable of setting a plurality of set data, which derive various timing signals, at a high speed, and a method for the same.

In accordance with the present invention, a timing signal generating device for generating timing signals in accordance with set data, comprises, a first setting circuit for outputting first set data to be used to generate the timing signals, a second setting circuit for outputting second set data to be used to generate the timing signals, a generating circuit for generating first timing signals in accordance with the first set data input from the first setting circuit, and a controller for defining a timing for setting the second set data output from the second setting circuit in said generating circuit. The generating circuit generates second timing signals in accordance with the second set data input from the second setting circuit at the timing defined by the controller.

Further, in accordance with the present invention, a timing signal generating device for generating timing signals in accordance with set data, comprises, a setting circuit for selectively outputting first set data or second set data to be used to generate the timing signals, a generating circuit for generating timing signals to be used to drive an image pickup device, which generates pixel signals representative of an optical image, a controller for defining a timing for setting the second set data in said generating circuit, and a transferring circuit for selectively transferring the first set data or the second set data to the generating circuit and transferring the timing signals to the image pickup device. The setting circuit controls a direction of data transfer effected via the transferring circuit, and wherein the generating circuit generates first timing signals in accordance with the first set data output from the setting circuit, generates second timing signals in accordance with the second set data transferred at the timing defined by the controller, and selectively feeds the first timing signals or the second timing signals to the image pickup device, which is connected to the generating circuit via the transferring circuit.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
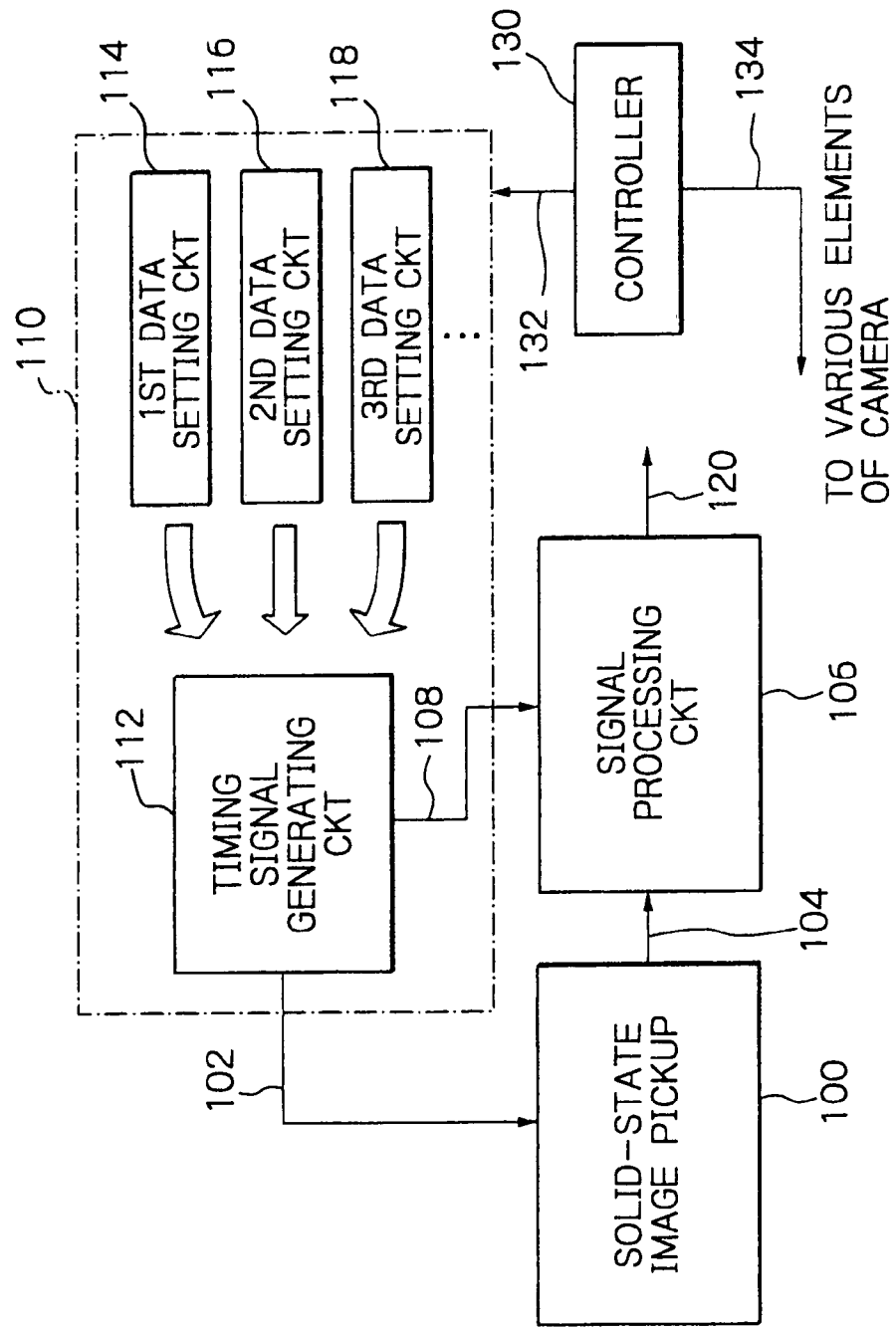
FIG. 1 is a block diagram schematically showing a timing signal generating device embodying the present invention.

Preferred embodiments of a device and a method for generating timing signals in accordance with the present invention will be described hereinafter. Part of the illustrative embodiments not directly relevant to the understanding of the present invention is not shown or will not be described. In the figures, reference numerals attached to signals designate signal lines on which they appear.

Referring to FIG. 1 of the drawings, a digital camera including a timing signal generating device embodying the present invention is shown. As shown, the digital camera is generally made up of a solid-state image pickup 100, a signal processing circuit 106, and a timing signal generating device 110. The image pickup 100 includes a CCD (Charge Coupled Device) image sensor or a CMOS (Complementary Metal Oxide Semiconductor) image sensor although not shown specifically. The timing signal generating device 110 generates two different kinds of timing signals 102 and 108. The timing signal 102 is input to the image pickup 100 for driving it. The timing signal 108 is input to the signal processing 106 so as to define various processing timings assigned to the signal processing 106.

Specifically, the timing signal generating device 110 includes a timing pulse generating circuit 112 and a plurality of data settings, i.e., a first data setting circuit 114, a second data setting circuit 116, a third data setting circuit 118 and so forth. The data setting circuits 114, 116, 118 and so forth each set in the timing pulse generating circuit 112 particular data that define the timing, waveform and repetition pattern of a timing signal. The timing pulse generating circuit 112 periodically generates timing signals in accordance with the data set therein. More specifically, a controller 130 feeds a control signal 132 to the timing pulse generating circuit 112 and causes it to generate the above timing signals. As conceptually depicted with an arrow 134 interconnected to the various elements of the digital camera, the controller 130 controls the operation modes of the camera and determines timing for setting the data in the timing pulse generating circuit 112.

The digital camera shown in FIG. 1 is selectively operable in three different modes, i.e., a movie mode for picking up a movie, a still picture mode for picking up a still picture, and a record/reproduction mode. In the illustrative embodiment, the first data setting circuit 114 feeds to the timing pulse generating circuit 112 a plurality of set data for generating a plurality of timing signals matching with the movie mode. The second data setting circuit 116 feeds to the timing pulse generating circuit 112 a plurality set data for generating a plurality of timing signals matching with the still picture mode. Further, the third data setting circuit 118 feeds to the timing pulse generating circuit 112 a plurality of set data for generating various timing signals necessary for the reproduction mode, which reproduces image data recorded by the digital camera in the record mode.

In the illustrative embodiment, the timing signal 102 includes pulses for shifting signal charges generated in the image sensor to vertical and horizontal transfer paths, charge transfer pulses for driving the transfer paths, and sweep signals for sweeping the charges on the transfer paths. Further, the timing signal 102 includes a read signal for reading the transferred charges, or pixel signals, as an electric signal, field-through clamp pulses for sampling the pixel signals by correlated double sampling, and signal output clamp pulses. The waveforms of these timing signals each vary in a particular pattern in accordance with the mode available with the camera. The image pickup 100 therefore outputs a pixel signal matching with the movie mode or the still picture mode on its output 104. In the still picture mode, for example, the above drive signals implement an electronic shutter function that generates charges over an exposure time matching with an automatically set exposure value.

The output 104 of the image pickup 100 is connected to the signal processing circuit 106. The signal processing circuit 106 processes the pixel signal, which appears on its input 104, at a timing corresponding to the timing signal 108. Specifically, the signal processing circuit 106 executes compression coding with the pixel signal and produces the resulting image data on its output 120. For this purpose, the signal processing circuit 106 includes a clamping circuit, not shown, for clamping a preselected level of the pixel signal. An analog-to-digital converter, not shown, converts the pixel signal to digital values at a timing corresponding to a pixel clock.

A color separating circuit, not shown, separates color components included in the pixel signal in accordance with the layout of a color filter not shown. A YC converting circuit, not shown, converts the separated color components to Y (luminance) data and C (chrominance) data on the basis of the pixel value of the color component. A compression coding circuit codes the Y data and C data by compression. The timing signal 108 input to the signal processing circuit 106 includes clamp pulses, a pixel clock, pulses for color separation, a sample-and-hold signal, and a control signal for controlling the coding timing. The signal lines 102 and 108 each are representative of such a plurality of signal output lines for the simplicity of illustration.

The output 120 of the signal processing circuit 106 is connected to, e.g., a display and a recording/reproducing apparatus although not shown specifically. The recording/reproducing apparatus is capable of recording or reproducing the image data in or out of a data recording medium, not shown, as needed. The image data can therefore be displayed, recorded or transmitted in a desired format. In a reproduction mode, the recording/reproducing apparatus reads the image data out of the recording medium and delivers them to the signal processing circuit 106. In response, the signal processing circuit 106 decodes the image data by expansion and writes the decoded image data in a video memory not shown. Subsequently, the image data appear on the display in the form of a moving picture or a still picture in accordance with the settings of the image data, while being transferred to any desired apparatus. At this instant, the third data setting circuit 118 feeds the set data to the timing pulse generating circuit 112, causing it to generate timing signals necessary for the reproduction of a picture. For example, in the reproduction mode, the timing pulse generating device 110 generates timing signals necessary for expansion, or decoding, and timing signals for controlling the video memory in such a manner as to zoom a picture.

As stated above, the illustrative embodiment includes a plurality of data setting circuits each for feeding to the timing pulse generating circuit 112 particular set data necessary for generating particular timing signals. It is therefore possible to set data matching with the operation mode of the digital camera and therefore to generate a plurality of groups of timing signals different in function from each other.

Assume that the operator of, e.g., a camera desires to start it up by giving priority to a shooting function at the time of power-up of the camera. Then, set data for generating drive signals and timing signals meant for a monitor mounted on the camera are set in the timing signal generating device 110. In response, the timing signal generating device 110 feeds minimum necessary timing signals for the camera to the various sections of the camera and thereby rapidly starts up the camera. This allows the operator to frame a picture appearing on the monitor while watching the monitor.

On the other hand, assume that the operator selects a still picture mode without using the monitor. Then, when the camera is started up, set data for generating the timing signals 102 and 108, which effect the pickup of a still picture in response to shutter release, are set in the timing signal generating device 110. This successfully reduces the interval between the time of power-up and the end of preparation of the camera for a shot.

Further, when the operator desires to process the image data stored in the video memory of the signal processing circuit 106, other data necessary for generating required timing pulses and a control signal are set in the timing signal generating device 110. This allows the image data stored in the video memory to be processed in accordance with the above timing signals and written to, e.g., a data recording medium.

Figure 2:
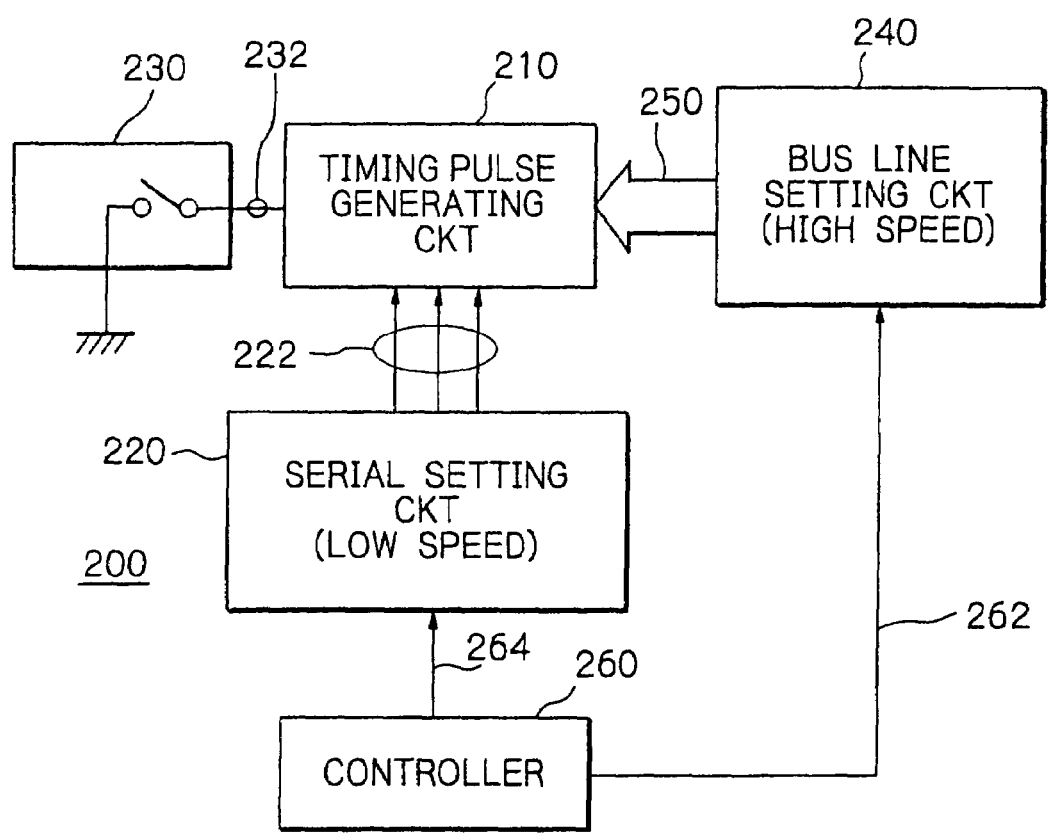
FIG. 2 is a schematic block diagram showing an alternative embodiment of the present invention.

Reference will be made to FIG. 2 for describing an alternative embodiment of the present invention. This embodiment differs from the previous embodiment in that it uses a plurality of data setting methods, as distinguished from a plurality of data setting circuits, for the same purpose. As shown, a timing signal generating device, generally 200, includes a timing pulse generating circuit 210 and a serial setting circuit 220. The timing pulse generating circuit 210 generates timing signals in accordance with set data fed from the serial setting circuit 220. The serial setting 220 delivers the set data to the timing pulse generating circuit 210 via a connection line 222, which is made up of three lines.

A switch 230 switches timing signal data stored in the timing pulse generating circuit 210 and therefore the timing signals to be output from the generating circuit 210. Specifically, in the illustrative embodiment, the switch 230 is constructed to selectively connect an input terminal 232 to ground, i.e., a reference potential. With this construction, the switch 230 varies the potential on the input terminal 232 and thereby switches the timing signals to be output from the timing pulse generating circuit 210. Alternatively, the input terminal 232 may be pulled up to a preselected value, e.g., a power source voltage in order to select a desired function.

A bus line setting circuit 240 transfers set data to the timing pulse generating circuit 210 via a parallel bus 250. The bus line setting circuit 240 is capable of setting data at a higher speed than the serial setting circuit 220. For example, the bus line setting circuit 240 sends a great amount of set data representative of basic patterns of timing signals to the timing pulse generating circuit 210. In the illustrative embodiment, the above data are so configured as not to vary the timings of a camera or similar system in operation, which includes the timing signal generating device 200. The bus line setting circuit 240 has an output connected to the timing pulse generating circuit 210 via the parallel bus 250.

Conversely, in the event of serial setting, the serial setting circuit 220 sets a small amount of set data in the timing pulse generating circuit 210 in a short period of time via the line 222. In this case, when the camera or similar system is in operation, the timing signals can be varied in order to cause the system to operate in a corresponding mode.

As stated above, in the illustrative embodiment, the serial setting circuit 220 is capable of varying the timings by varying the set data while a system is in operation. The bus line setting circuit 240 transfers the set data representative of timing signals, which do not vary timings while the system is in operation, to the timing pulse generating circuit 210 at a high speed. In this construction, data are set in the timing pulse generating circuit 210 via the parallel bus 250 at the time of start-up of the system. On the other hand, when the operation mode of the system should be varied, data are set in the timing pulse generating circuit 210 via the serial line 222. A controller 260 included in the system, on which the timing signal generating device 200 is mounted, may control the timing for selecting the parallel setting or the serial setting via control lines 262 and 264, respectively.

Figure 3:
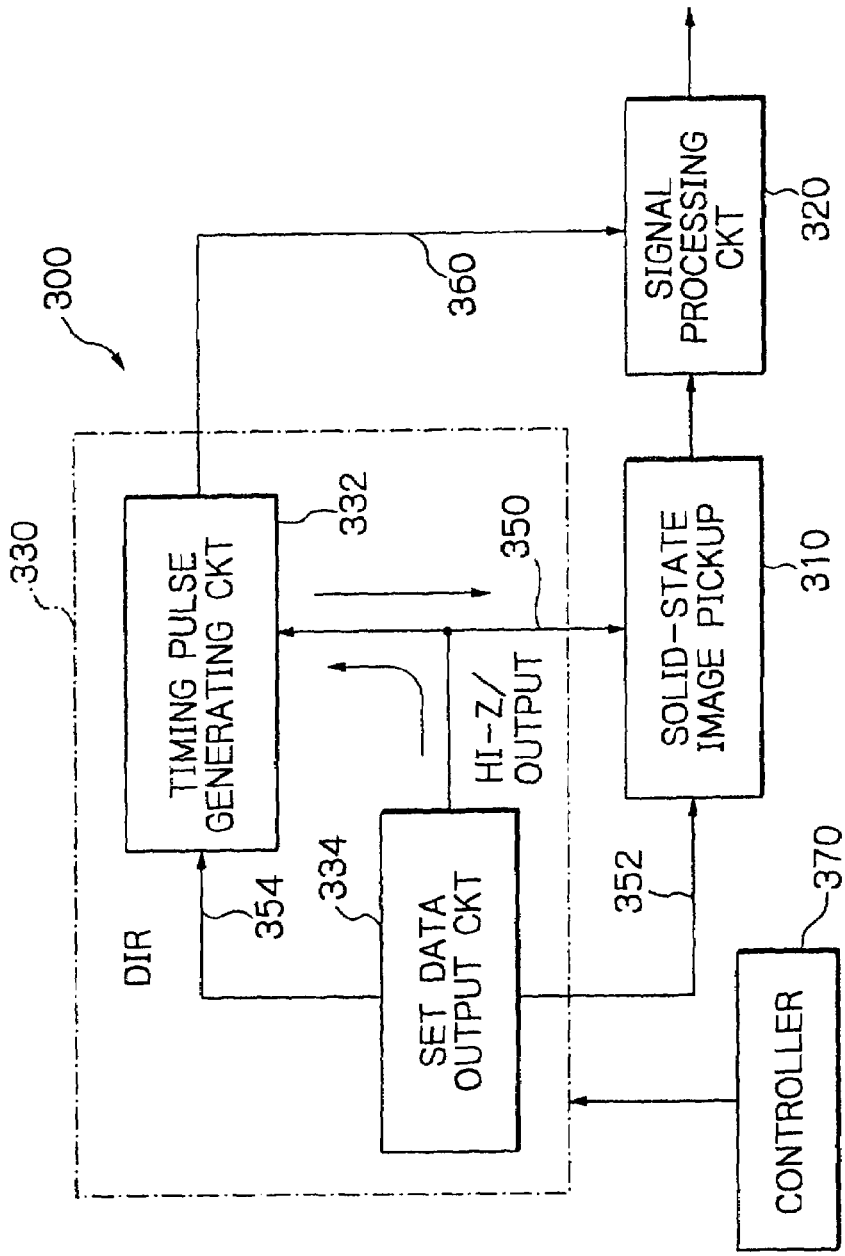
FIG. 3 is a schematic block diagram showing another alternative embodiment of the present invention.

Another alternative embodiment of the present invention will be described with reference to FIG. 3. As shown, a camera 300 includes a solid-state image pickup 310, a signal processing circuit 320, a timing signal generating device 330 and a controller 370. The image pickup 310 includes an image sensor while the signal processing circuit 320 processes signals output from the image pickup 310. The timing signal generating device 330 is adapted to generate timing signals under the control of the controller 370 to be input to the image pickup 310 and signal processing circuit 320. The timing signal generating device 330 is made up of a timing pulse generating circuit 332 and a set data output circuit 334, which feeds set data for generating timing signals to the timing pulse generating circuit 332.

While the image pickup 310 and signal processing circuit 320 may be respectively identical in construction with the image pickup 100 and signal processing 106, FIG. 1, they have additional features to be described hereinafter. The image pickup 310 includes the image sensor and a correlated double sampling circuit, not shown, and has an input 350 connected to the output of the timing pulse generating circuit 332. In the illustrative embodiment, the image sensor and correlated double sampling circuit are basically driven by timing pulses and other drive signals appearing on the input 350. The set data output circuit 334 feeds an input enable signal to the input 352 of the image pickup 310. When the input enable signal is in a low level, the image pickup 310 validates its input 350 and operates in accordance with the drive signals 350. When the input enable signal is in its high level, the image pickup 310 invalidates the input 350 and freezes the operations of the image sensor and various circuits thereof.

Further, the set data output circuit 334 feeds a transfer direction switching signal (DIR) to the input 354 of the timing pulse generating circuit 332. When the signal DIR is indicative of "output", the timing pulse generating circuit 332 delivers the drive signals to the image pickup 310 via its output 350 to thereby drive the image pickup 310. When the signal DIR is indicative of "input", the timing pulse generating circuit 332 does not generate any drive signal, but takes in a signal appearing on its input 350. Specifically, the set data output circuit 334 delivers set data to the timing pulse generating circuit 332 via its output 350, allowing the timing signal generating device 330 to generate timing signals. In this manner, the transfer direction switching signal DIR causes the output terminal of the timing pulse generating circuit 332 to selectively serve as an input terminal for receiving the set data.

The set data output circuit 334 may be constructed in the same manner as the data setting circuits 114 through 118, FIG. 1, or the serial setting circuit 220, FIG. 2. In the illustrative embodiment, the set data output circuit 334 has an additional function to be described hereinafter with reference to FIG. 4.

Figure 4:
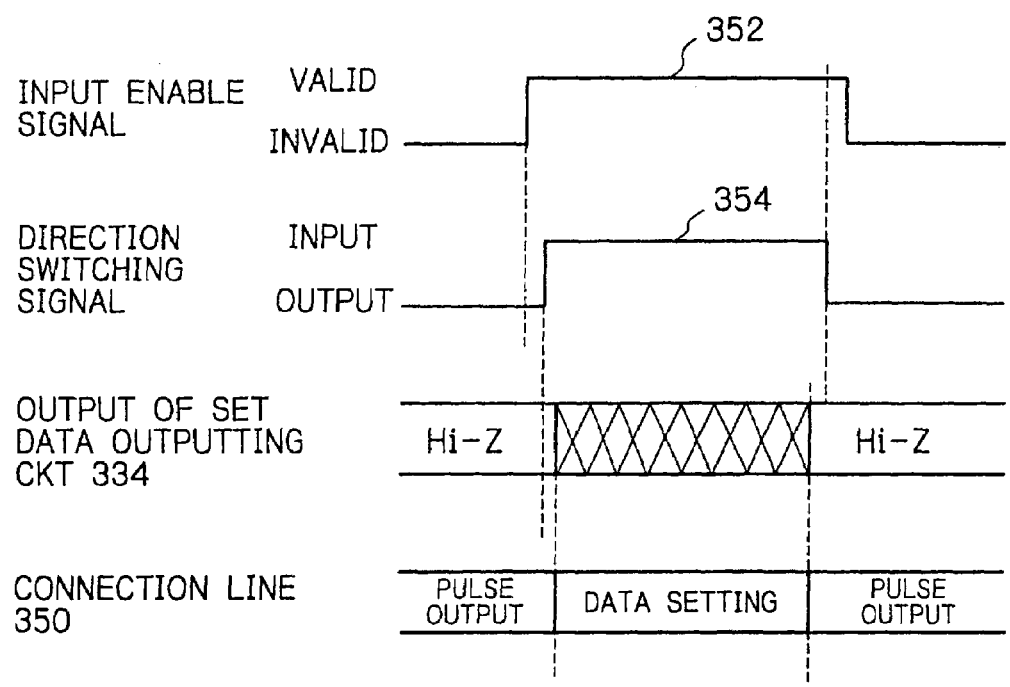
FIG. 4 is a timing chart demonstrating a specific operation of the embodiment shown in FIG. 3.

As shown in FIG. 4, at the time for driving the image pickup 310, the set data output circuit 334 causes the transfer direction switching signal 354 fed to the image pickup 310 to indicate "output". At the same time, the set data output circuit 334 controls its output 350 to a high impedance state (Hi-Z). At the time for feeding set data to the pulse generation 332, the set data output circuit 334 invalidates the input enable signal 352, i.e., causes it to go high so as to freeze the operation of the image pickup 310. Subsequently, the set data output circuit 334 causes the transfer direction signal 354 to indicate "input" in order to switch the direction of data transfer. At the same time, the set data output circuit 334 cancels the high impedance state of its output 350 and then feeds set data via the output 350. When a plurality of set data are input to the timing pulse generating circuit 332 by the above procedure, the generating circuit 335 generates various timing signals based on the set data.

In the illustrative embodiment, the drive signals and set data share a single connection line 350 that connects the timing pulse generating circuit 332 and image pickup 310. Alternatively, the set data output from the set data output circuit 334 may be routed through a connection line 360, which connects the timing pulse generating circuit 332 and signal processing 320, to the generating circuit 332. Further, the set data output circuit 334 may be replaced with a plurality of set data outputting circuits.

As stated above, the illustrative embodiment transfers set data to the timing pulse generating circuit 332 by using an output line assigned to timing signals. This is successful to obviate the need for an exclusive connection line and exclusive terminals for data setting.

Figure 5:
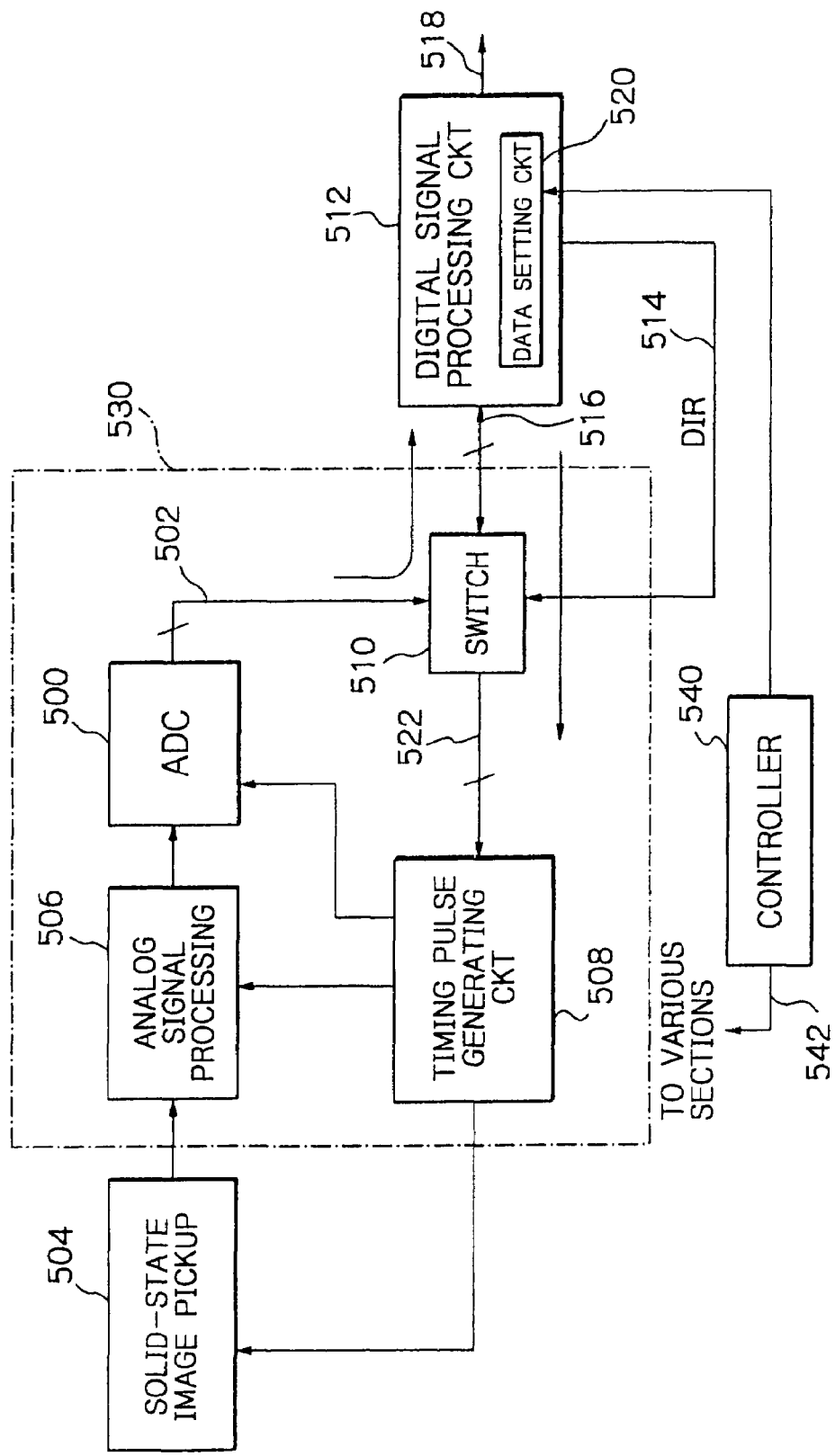
FIG. 5 is a schematic block diagram showing still another alternative embodiment of the present invention.

Still another alternative embodiment of the present invention, which is also implemented as a camera, will be described with reference to FIG. 5. As shown, the camera is characterized in that an ADC (Analog-to-Digital Converter) 500 has an output bus 502 used not only to deliver the output of the ADC 500 but also to set data. Specifically, the camera includes an analog signal processing circuit 506 for processing pixel signals output from a solid-state image pickup 504. The ADC 500 converts processed image signals output from the analog processing circuit 506 to digital image data and outputs the digital image data to the output bus 502. A timing pulse generating circuit 508 feeds particular timing signals to each of the image pickup 504, analog signal processing circuit 506, and ADC 500.

The output bus 502 of the ADC 500 is connected to a switch 510. When the image data should be delivered to a digital signal processing circuit 512, the switch 510 connects the bus 502 to a bus 516 in accordance with a direction switching signal (DIR) 514 fed to its input 514. In this configuration, the image data output from the ADC 500 are input to the digital signal processing circuit 512 via the switch 510.

The digital signal processing circuit 512 plays the role of an image processing circuit that processes the image data appearing on the input 516. The processed image data are delivered via an output 518. In the illustrative embodiment, the digital signal processing circuit 512 includes a data setting circuit 520 for outputting set data to be fed to the timing generating circuit 508.

Figure 6:
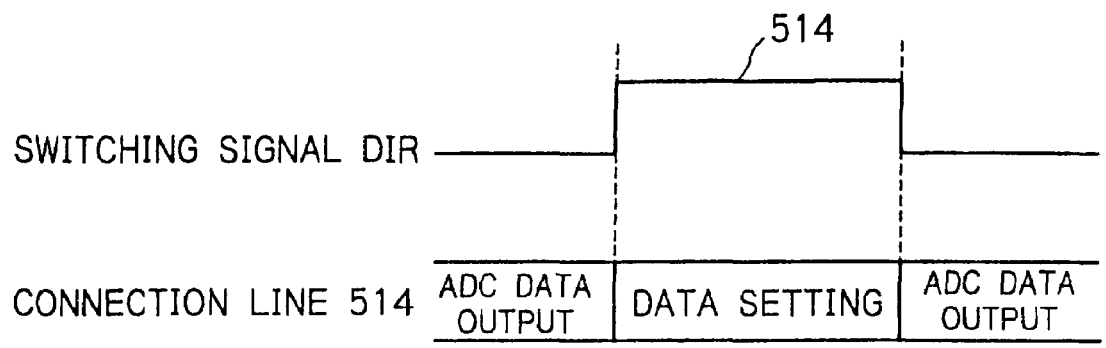
FIG. 6 is a timing chart demonstrating a specific operation of the embodiment shown in FIG. 5.

More specifically, the data setting circuit 520 stores a plurality of different set data for generating various timing signals. To set the data in the timing pulse generating circuit 508, the data setting circuit 520 feeds the direction switching signal DIR to the switch 510 at a timing shown in FIG. 6 specifically. In response, the switch 510 disconnects the bus 502 from the bus 516 and connects the bus 516 to a bus 522. As a result, the timing pulse generating circuit 508 and digital signal processing circuit 512 are interconnected. In this condition, the set data stored in the data setting circuit 520 is delivered to the timing pulse generation via the switch 510.

In the illustrative embodiment, the analog processing circuit 506, ADC 500, timing pulse generating circuit 508 and switch 510 are implemented as an integrated device 530, which is either a single chip or a more densely mounted multichip module. In this case, the image pickup 504 may be included in the package or the module. The integrated device 530 and digital processing circuit 512 are interconnected by the bus 516, so that the set data can be transferred to the timing pulse generating circuit 508 via the bus 516. The connection line 514 for transferring the direction switching signal DIR is connected to the integrated device 530, realizing a system construction including a minimum of mounting wiring. Further, the set data are transferred from the digital signal processing circuit 512 to the timing pulse generating circuit 508 in parallel. Such parallel transfer is successful to transfer a greater amount of set data than serial transfer.

A controller 540 feeds control signals 542, which define the operation of the camera, to the various sections and causes the data setting circuit 520 to output the set data at a timing matching with the operation. Although the data setting circuit 520 is shown as being included in the digital processing circuit 512, it may alternatively be included in any other circuit connected to the bus 516. For example, the data setting circuit 520 may be included in the controller 540 that controls the various sections of the camera.

Figure 7:
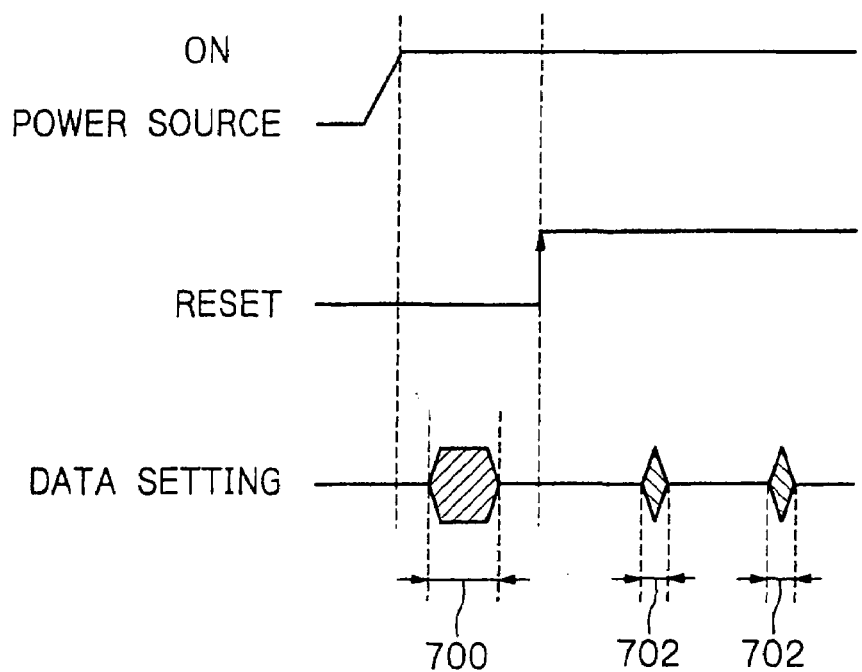
FIG. 7 is a timing chart representative of a specific data setting timing available with the embodiment shown in FIG. 5.

The illustrative embodiment, like the previous embodiments, is capable of setting a great amount of set data just after the power-up of the camera and set, when the operation of the camera is switched, new set data in the timing pulse generating circuit 508. For example, as shown in FIG. 7, a great amount of set data 700 is set in the timing pulse generating circuit 508 at a high speed just after the power-up of the camera. Subsequently, assume that the controller 540 switches modes in accordance with the operating conditions of the camera, requiring new set data. Then, new set data 702 are transferred to the timing pulse generating circuit 508 at the time of switching of the modes. Because the new set data 702 are smaller in amount than the initial set data, the data 702 may be fed to the timing pulse generating circuit 508 by serial transfer, i.e., at a low speed.

The illustrative embodiments described so far do not have to transfer all set data to the timing pulse generation 508 at the time of power-up, so that the amount of set data to be transferred at the time of power-up is successfully reduced. Particularly, when the operator of the camera desires to shoot a scene just after power-up, only the set data necessary for generating timing signals for a shot suffice and reduce the start-up time of the camera. The operator is therefore prevented from loosing a chance of releasing the shutter. Timing signals to be required later in accordance with signal processing or the mode can be transferred to the timing signal generating circuit 508, as needed.

Figure 8:
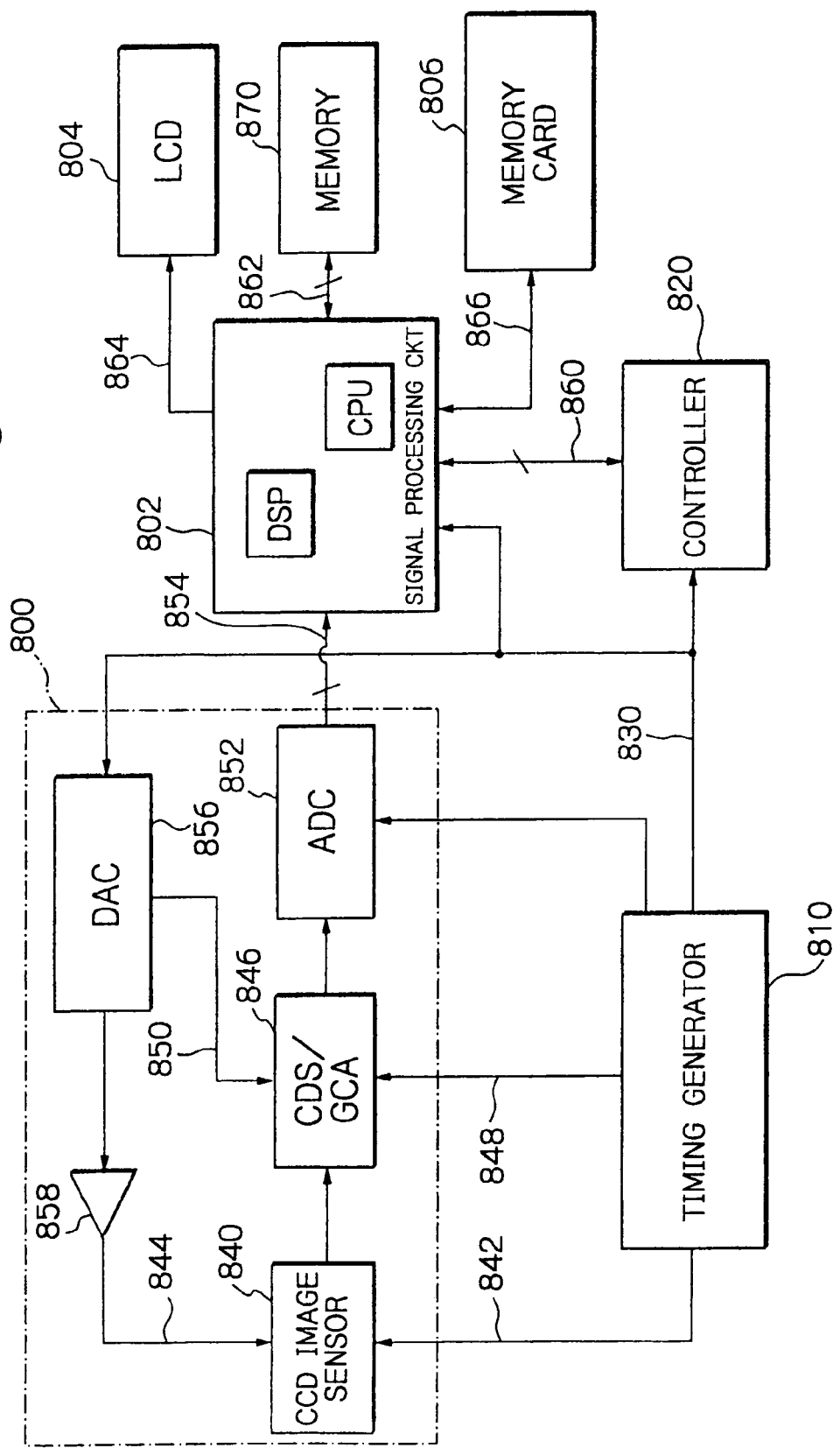
FIG. 8 is a schematic block diagram showing a further alternative embodiment of the present invention.

A further alternative embodiment of the present invention will be described with reference to FIG. 8. As shown, a digital camera includes an image pickup section 800 for shooting a scene and outputting image data representative of the scene, and a signal processing circuit 802 for processing the image data. The signal processing circuit 802 includes a DSP (Digital Signal Processor) and a CPU (Central Processing Unit). An LCD (Liquid Crystal Display) or monitor 804 displays a picture represented by the processed image data. Also, the processed image data are subjected to compression coding and then written to a memory card or similar data recording medium 806.

A controller or CPU 820 feeds set data to a timing generator 810 at a high speed on a serial bus 830. The timing generator 810 generates, based on the set data, timing signals for driving the image pickup section 800. The serial bus 830 connects the image pickup section 800, signal processing circuit 802, timing generator 810, and controller 820. Any circuit received a selection signal from the controller 320 takes in the data transferred on the serial bus 830.

In the illustrative embodiment, the controller 820 is selectively operable in a high-speed transfer mode or a low-speed mode. In the high-speed transfer mode, the controller 820 outputs set data to the serial bus 830 at a high speed. The set data define the timings, waveforms and repetition patterns of the timing signals to be generated by the timing generator 810. At the time of start-up following power-up, the controller 820 delivers a selection signal to the timing generator 810, sets the high-speed transfer mode, and feeds set data via its output 830. Further, in the high-speed transfer mode, the controller 820 delivers a selection signal and set data to the image pickup section 800. The set data fed to the image pickup section 800 are representative of analog voltages to be applied to a CCD image sensor 840, a CDS (Correlated Double Sampler)/GCA (Gain Controlled Amplifier) 846 and other analog circuits included in the image pickup section 800. The set data meant for the image pickup section 800 may be fed from the timing generator 810, if desired.

The controller 820 starts operating in the low-speed transfer mode as soon as the camera enters a usual operation mode after the start-up. In the low-speed transfer mode, the controller 820 delivers at a low speed various control signals for controlling the timing generator 810 and other circuits on the serial bus 830. Specifically, the controller 820 selectively sets a shoot mode, a reproduction mode or similar operation mode available with the camera and delivers set data matching with the operation mode to the timing generator 810. As a result, the camera performs pickup processing, signal processing and record/reproduction processing in accordance with timing signals output from the timing generator 810.

In the image pickup section 800, an optical image representative of a scene is incident to the photosensitive surface of the CCD image sensor or bidimensional image sensor 840. Also, timing pulses and voltages are fed to the CCD image sensor 840 via inputs 842 and 844, respectively. The CCD image sensor 840, driven by the timing pulses and voltages, feeds pixel signals representative of the incident optical image to the CDS/GCA 846. The CDS/GCA 846 executes correlated double sampling with the pixel signals in accordance with timing pulses and a control voltage applied to its inputs 848 and 850, respectively. The CDS/GCA 846 then amplifies the sampled pixel signals with a variable gain. The output of the CDS/GCA 846 is connected to an ADC 852. The ADC 852 converts the pixels signals output from the CDS/GCA 846 to digital image data and delivers the image data to the signal processing circuit 802 via its output 854.

A DAC (Digital-to-Analog converter) 856 is also included in the image pickup section 800 and receives set data from the controller 820 on the serial bus 830. The DAC 856 produces an analog voltage corresponding to the set data. The DAC 856 has one output connected to an amplifier 858 and another output connected to the CDS/GCA 846. The amplifier 858 amplifies the voltage input from the DAC 856 by a preselected amplification ratio. The amplifier 858 has an output 844 connected to the CCD 840 and feeds various control voltages including an OFD (Overflow Drain) voltage and a PG (Precharge Drain Bias) voltage to the CCD 840. The DAC 856 applies a control voltage to the CDS/GCA 846 in accordance with the set data via the output 850.

The signal processing circuit 802 receives a control signal from the controller 820 via an input 860 and receives timing signals from the timing generator 810 on the serial bus 830. The signal processing circuit 802 provides the image data received from the ADC 852 via its input 854 with a preselected format by digitally processing them. When the controller 820 delivers a selection signal to the signal processing circuit 802, the signal processing circuit 802 takes in the timing signals and control signals appearing on the serial bus 830. The signal processing circuit 802 has this function in addition to the function of the digital signal processing 512, FIG. 5. The signal processing circuit 802 performs, by using a memory 870 connected thereto, calculations with the image data in a mode indicated by the control signal, which is output from the controller 820. By the calculations, the signal processing circuit 802 generates data to be displayed and data to be recorded. The data to be displayed are fed to the LCD 804 via the output 864 of the signal processing circuit 802, so that a picture based on the data appears on the LCD 804. The data to be recorded are written to the preselected area of the memory card 806, which is connected to the output 866 of the signal processing circuit 802.

The timing signal generator or timing signal generating circuit 810 generates timing signals in accordance with set data fed from the controller 820 and signal processing circuit 802 and produces the timing signals on the outputs 842 and 848. Further, the timing signal generator 810 generates timing signals, including a pixel clock, necessary for the signal processing circuit 802 and delivers them to the signal processing circuit 802 on the serial bus 830. In the illustrative embodiment, at the time of start-up of the camera, the timing generator 810 stores set data transferred thereto in the high-speed transfer mode and generates timing signals matching in timing and waveform to the set data. When the operation mode of the camera is switched under the control of the controller 820, the timing generator 810 stores set data transferred thereto in the low-speed transfer mode and generates timing signals matching in timing and waveform to the new set data, i.e., to the new operation mode.

As stated above, information are transferred over the serial bus 830 in one of at least two different modes, i.e., the high-speed transfer mode and low-speed transfer mode. A data transfer rate to be assigned to the low-speed transfer mode should preferably be matched to a circuit whose information receiving ability is lowest.

Figure 9:
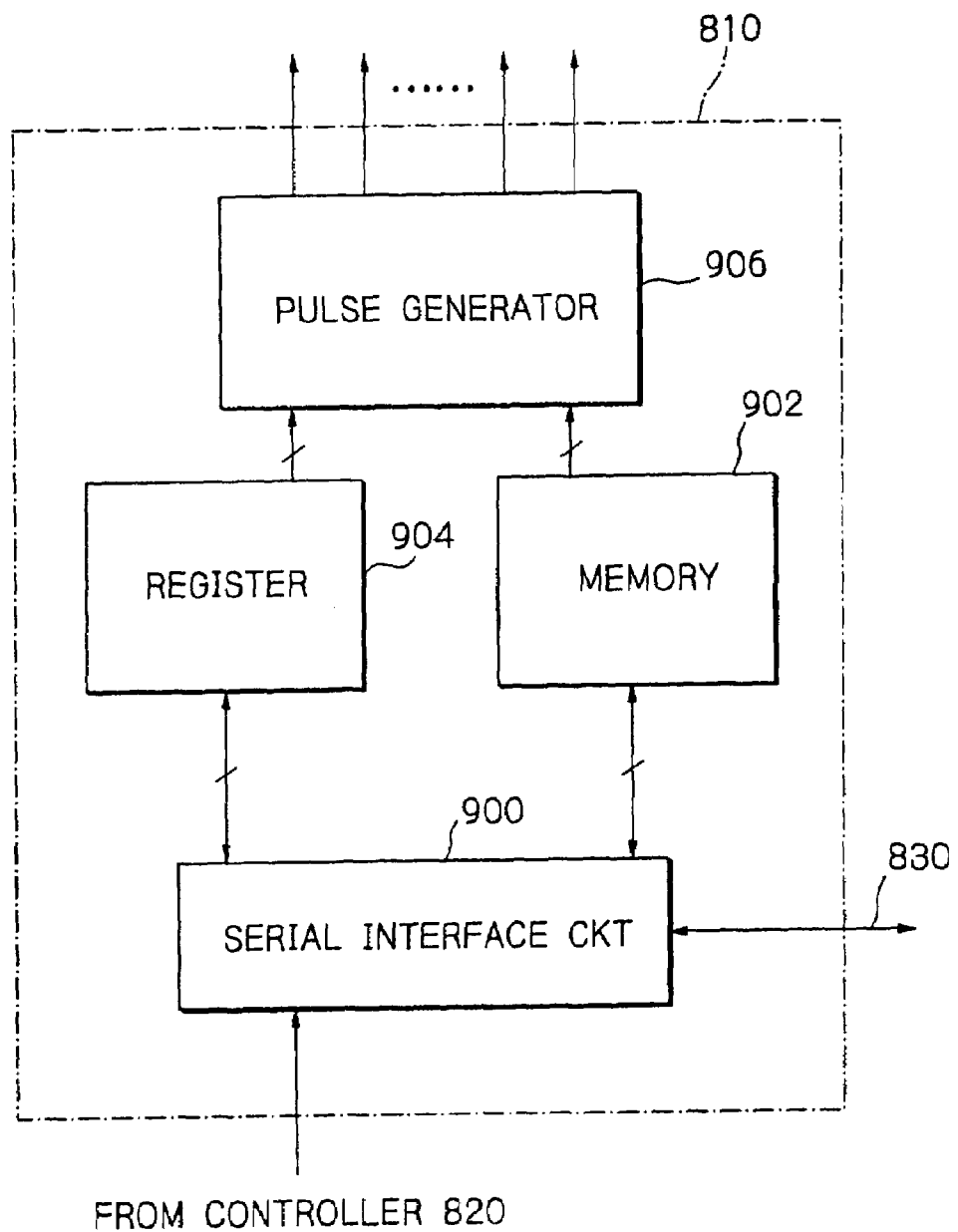
FIG. 9 is a schematic block diagram showing a specific configuration of a timing generator included in the embodiment of FIG. 8.

FIG. 9 shows a specific configuration of the timing generator 810. As shown, the timing generator 810 includes a serial interface circuit 900 to which the serial bus 830 is connected. When the controller 820 feeds a selection signal to the timing generator 810, the timing generator 810 takes in set data appearing on the serial bus 830. The timing generator 810 then delivers information corresponding to the set data to a memory 902 and a register 904.

The memory 902 stores timing information representative of waveforms and timings for generating timing signals in accordance with set data. The register 904 stores information representative of, e.g., the repetition patterns of the timing signals. Such information are input to a pulse generator 906. The pulse generator 906 counts the timing information and repetition patterns with a counter, not shown, and generates signal pulses in synchronism with the counting timing. The signal pulses or timing signals are fed from the pulse generator 906 to the image pickup section 800 and signal processing circuit 802. The memory 902 additionally stores analog voltages to be used by the image pickup 800. Data representative of the analog voltages are delivered to the image pickup 800 via the serial interface circuit 900 and serial bus 830. Consequently, the image pickup 800 sets control voltages and applies drive voltages to the CCD image sensor 840 and CDS/GCA 846, which are analog circuits.

Pending Japanese patent application No. 83514/1999, for example, discloses a mechanism available for generating the above timing pulses. The mechanism disclosed in this document includes a horizontal counter for counting a reference clock and reset in synchronism with a horizontal synchronizing signal. A memory circuit stores pattern data used to generate various timing pulses and representative of timing pulses to appear for a single period at the beginning of a single horizontal scanning period. The memory circuit additionally stores pattern data representative of repetition frequencies within the single horizontal scanning period of the above timing pulses. A setting circuit reads pattern data assigned to required timing pulses out of the memory circuit and sets them in a horizontal register. A timing pulse generating circuit generates timing pulses on the basis of the count of the horizontal counter and the pattern data set in the horizontal register.

As stated above, in the illustrative embodiments shown and described, a camera or similar system is capable of rapidly setting set data, or original data for generating timing signals, at a few particular timings, e.g., on the power-up of the system. This successfully reduces the data setting time and allows a great amount of data to be set. The set data should preferably be information representative of timing signals that do not vary the timing of the system. When the timing of the system should be varied, new set data can be transferred to and set in a timing pulse generating circuit when, e.g., the operation mode of the system is switched under the control of a controller. Such set data are smaller in amount than the set data transferred at the time of start-up of the system. Further, by causing the set data to share a single bus with, e.g., image data, it is possible to miniaturize the system including the timing pulse generating circuit.

The set data can be transferred to the timing pulse generating circuit, or timing generator, any time in accordance with the function of the circuit and necessity, as stated above. It follows that a minimum amount of set data can be set at the time of start-up of the system. This not only reduces the start-up time, but also allows timing signals representative of sophisticated timings to be set. The set data have been shown and described as being transferred when the operation mode of the system is switched. Alternatively, the set data may be transferred during blanking period when a signal processing circuit is processing a moving picture signal having continuous frames. Also, the set data may be transferred during the exposure time of an image pickup section or at a time for executing invalid pixel processing. The controller controlling the system can define any one of such timings.

Further, by assigning a first and a second bus to high-speed and low-speed data transfer, respectively, it is possible to transfer the set data via the first bus at a high speed in accordance with the contents of the data while transferring other set data to other circuits via the second bus at a low speed.

In summary, in accordance with the present invention, a timing signal generating device includes a plurality of setting means for setting set data, which are used to generate timing signals. The device of the present invention can therefore reduces a data setting time, particularly at the start-up of a system including the device. A route for the transfer of the set data is selectable for rapid setting, so that the start-up time is further reduced. Further, any one of a plurality of setting means can set the set data at a preselected timing defined by the controller. The set data therefore do not have to be set at the time of start-up, i.e., they may be set any time in accordance with the operation of the system.

With a plurality of setting means, the device transfers set data at a high speed at the time of start up, but transfers set data at a low speed during the interval of a system operation, as stated above. This not only realizes a short start-up time, but also allows set data corresponding to various operation patterns of the system to be adequately set at discrete times.

The entire disclosure of Japanese patent application No. 2000-24674 filed Jan. 28, 2000 including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A timing signal generating device for generating timing signals in accordance with set data, comprising:
    a setting circuit for selectively outputting first set data or second set data to be used to generate the timing signals;
    a generating circuit for generating timing signals to be used to drive an image pickup device, which generates pixel signals representative of an optical image;
    a controller for defining a timing for setting said second set data in said generating circuit; and
    a transferring circuit for selectively transferring said first set data at a first speed or said second set data at a second speed to said generating circuit and transferring the timing signals to the image pickup device;
    wherein said setting circuit controls a direction of data transfer effected via said transferring circuit, and wherein said generating circuit generates first timing signals in accordance with said first set data output from said setting circuit, generates second timing signals in accordance with said second set data transferred at the timing defined by said controller, and selectively feeds said first timing signals or said second timing signals to the image pickup device, which is connected to said generating circuit via said transferring circuit, and
    wherein at a time of power-up of the image pickup device, said controller selects the first speed for transferring the first timing signals to the image pickup device, and after the power-up, said controller selects the second speed for transferring the second timing signals to the image pickup device, wherein the first speed is higher than the second speed, and
    wherein when said generating circuit feeds said first timing signals or said second timing signals to the image pickup device, said setting circuit controls an output of said setting circuit to a high impedance state.

2. A device in accordance with claim 1, wherein when said setting circuit outputs said first set data or said second set data, said setting circuit feeds a switching signal to said generating circuit to thereby switch an output of said generating circuit to an input.

3. A device in accordance with claim 2, wherein when said setting circuit outputs said first set data or said second set data, said setting circuit freezes the image pickup device.

4. A device in accordance with claim 1, wherein said setting circuit sets said first set data in said generating circuit when a system including said device is started up.

5. A device in accordance with claim 1, wherein said first timing signals represented by said first set data do not vary an operation of a system, which includes said device, under way.

6. A device in accordance with claim 1, wherein said second timing signals represented by said second set data vary an operation of a system, which includes said device, under way.

* * * * *